US008435578B1

(12) United States Patent
Baggett

(10) Patent No.: US 8,435,578 B1
(45) Date of Patent: May 7, 2013

(54) METHODS AND SYSTEMS TO PREPARE YEASTED DOUGH PRODUCTS

(76) Inventor: Nancy Baggett, Ellicott City, MD (US)

( * ) Notice: Subject to any disclaimer, the term of this patent is extended or adjusted under 35 U.S.C. 154(b) by 345 days.

(21) Appl. No.: 12/606,548

(22) Filed: Oct. 27, 2009

Related U.S. Application Data

(60) Provisional application No. 61/108,859, filed on Oct. 27, 2008.

(51) Int. Cl.
*A21D 8/00* (2006.01)
(52) U.S. Cl.
USPC ............... 426/62; 426/19; 426/496; 426/506
(58) Field of Classification Search .................. None
See application file for complete search history.

(56) References Cited

U.S. PATENT DOCUMENTS

| | | | |
|---|---|---|---|
| 3,449,131 A | | 6/1969 | Fritzberg et al. |
| 3,490,916 A | | 1/1970 | Henika |
| 4,020,184 A | | 4/1977 | Chesner |
| 5,939,109 A | * | 8/1999 | Domingues et al. ............... 426/8 |
| 6,004,600 A | * | 12/1999 | Van Over ...................... 426/231 |

OTHER PUBLICATIONS

Chowhound, "Kitchen Warfare's Cuban Bread (Tampa Style)", Kitchen Warfare, retrieved on Feb. 6, 2008, pp. 1-9. Available at: http://www.oo.com/kitchen-warfares-cuban-bread-tampae-style/, 9 pages.
"No-kneed Bread Recipe", Retrieved on Feb. 6, 2008, pp. 1-3. Available at: http://www.grouprecipes.com/1858/no-kneed-bread.html, 3 pages.
Bittman, Mark, "The Minimalist", The Secret of Great Bread: Let Time Do the Work, The New York Times, Nov. 8, 2006, pp. 1-3.
Fox, Nick, "Soon the Bread Will Be Making Itself", The New York Times, Nov. 21, 2007, pp. 1-3.

* cited by examiner

*Primary Examiner* — Lien T Tran
(74) *Attorney, Agent, or Firm* — Garrett IP, LLC

(57) ABSTRACT

Methods and systems to prepare yeasted dough products, such as breads, include inhibiting yeast activity prior to a first rise, conducting the first rise over an extended rise time, inhibiting yeast activity between the first rise and a second rise, and conducting the second rise over an accelerated second rise time. Inhibiting of yeast activity may include maintaining one or more of a liquid ingredient and a dough at a relatively cool temperature. The first rise may include maintaining the dough at a relatively cool temperature to restrict or retard yeast activity. Inhibiting of yeast activity prior to the first rise and/or retarding yeast activity during the extended first rise may improve one or more of flavor, aroma, texture, and appearance of a resultant baked good.

11 Claims, 1 Drawing Sheet

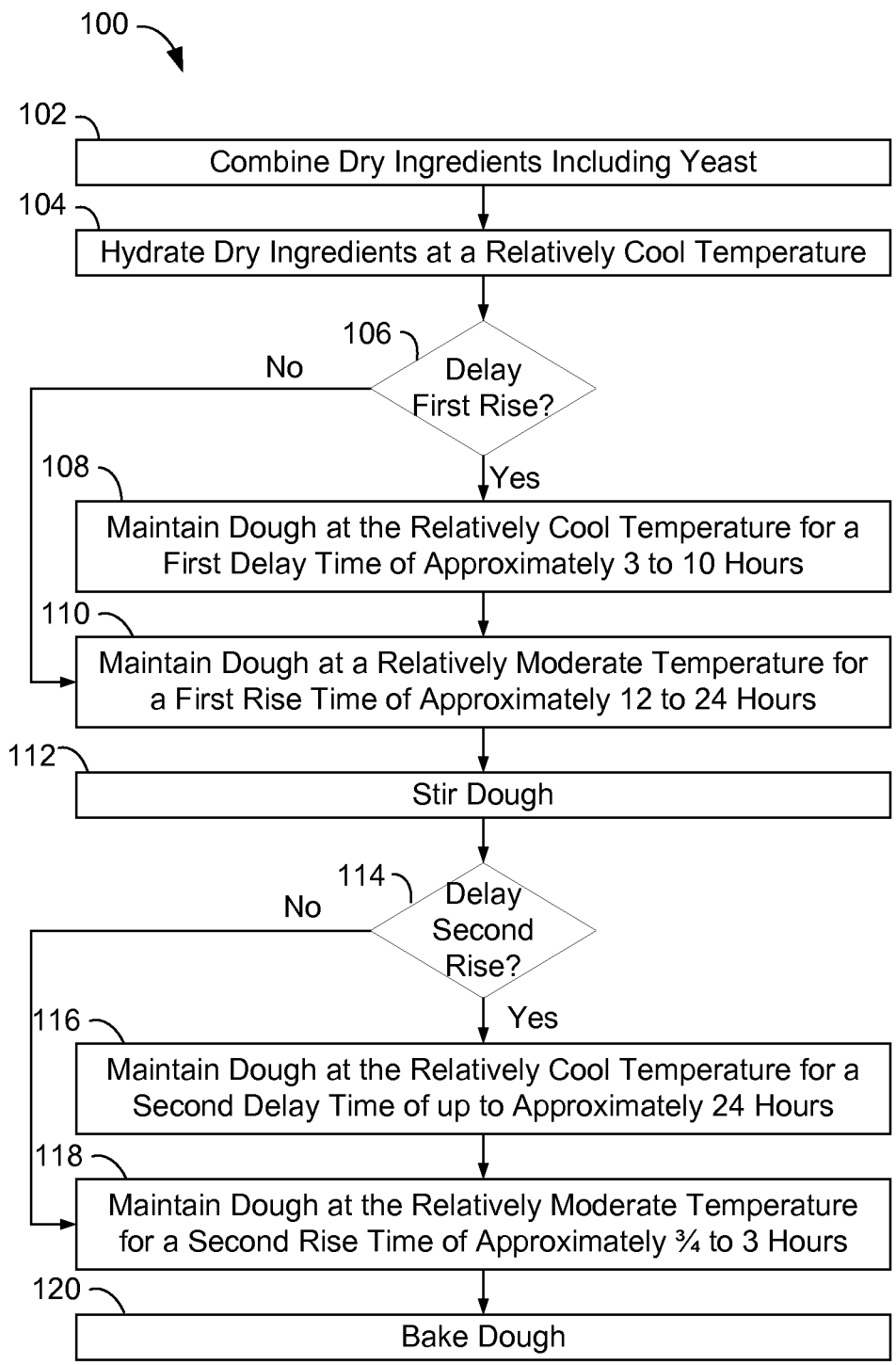

METHODS AND SYSTEMS TO PREPARE YEASTED DOUGH PRODUCTS

CROSS-REFERENCE TO RELATED APPLICATIONS

This application claims the benefit of U.S. Provisional Patent Application No. 61/108,859, titled "Methods of Preparing Yeasted Dough Products," filed Oct. 27, 2008, which is incorporated herein by reference in its entirety.

BACKGROUND

1. Technical Field

Disclosed herein are methods and systems to prepare yeasted dough, including variable start and stop times associated with first and second rise times, and variable temperatures.

2. Related Art

Conventional yeast-based dough preparation involves mixing ingredients into dough; kneading the dough to stimulate yeast activity, to increase hydration, and to initiate gluten development; allowing the kneaded dough to rise for a first rise time; punching down, stirring, folding, or re-kneading the risen dough to release gas bubbles from within the dough and to add any additional ingredients to the dough; allowing the dough to rise for a second rise time; and shaping and baking the risen dough. The number and ordering of the steps, and the timing of the first and second rise times are critical to the outcome of the baked dough, and thus necessitate availability of the baker at particular times. As a result, many people forego making of dough due to schedule constraints and the considerable number of required steps.

Automated bread making machines mix, knead, and bake at preset times, and thus do not necessitate availability of the baker at particular times. Automated bread making machines, however, support limited variations in bread types, shapes, ingredients, and personal touch.

Bread chemists have known for several decades that doughs, especially ones moist enough to permit extensive bubbling from fermentation, will eventually knead themselves.

Retarded rise techniques are described in P. Reinhart, "The Bread Baker's Apprentice: Mastering the Art of Extraordinary Bread," Ten Speed Press (December 2001).

SUMMARY

Disclosed herein are methods and systems to prepare yeasted dough, including variable start and stop times associated with first and second rise times, which may reduce scheduling constraints on a baker. Methods and systems disclosed herein may reduce labor and streamline yeasted dough making processes compared to conventional methods and systems. Methods and system disclosed herein may include substantially failsafe yeasted dough making methods and systems.

BRIEF DESCRIPTION OF THE DRAWINGS/FIGURES

FIG. 1 is a process flowchart of an exemplary method 100 of preparing a yeasted dough product.

DETAILED DESCRIPTION

FIG. 1 is a process flowchart of an exemplary method 100 of preparing yeasted dough products, or yeasted baked goods.

At 102, a plurality of dry ingredients, including yeast, is combined to create a dry yeasted mix.

The yeast may include yeast that is relatively easily dissolvable in a relatively cool liquid, as described below at 104. The yeast may include, for example, relatively fine or powdery yeast, which may include relatively fast-rising yeast, such as a bread machine yeast or an instant type of yeast.

The dry ingredients may further include one or more of flour, sugar, and salt. The dry ingredients or a portion thereof, may be combined at any suitable temperature, and may be packaged for later use in accordance with 104 below.

Where dough is to include sugar and flour, the combining of the dry ingredients at 102 may include mixing up to approximately 2 tablespoons of sugar per cup of flour. Where the dough is to include sugar and flour in a concentration of more than approximately 2 tablespoons of sugar per cup of flour, additional sugar may be added at 112 below.

As described below at 110, the dough may be subjected to an extended rise time. Accordingly, an amount of yeast used at 102 may be reduced relative to an amount of yeast recited in a recipe or relative to an amount used in conventional dough preparation. This may help to prevent the dough from rising too fast during the extended rise time.

Some ingredients may act as yeast or fermentation inhibitors. For example, sugar and dried fruit may combine with or attach to water in the dough, reducing the amount of water available for fermentation. Some herbs and spices may hinder yeast growth as a result of chemicals therein. For example, garlic, onion, oregano, thyme, mustard, cinnamon, cloves, cardamom, and ginger may have yeast retarding effects. During the extended first rise at 110 below, yeast inhibiting ingredients may delay a first rising, or may result in relatively flat bread.

Accordingly, yeast inhibiting ingredients may be limited in quantity, or omitted at 102 to reduce such yeast-inhibiting effects. As described below, enhanced flavor and aroma provided by one or both of a delay at 108, and the extended first rise at 110, may compensate for the reduced ingredients. Additional quantities of such ingredients may, nevertheless, be added to the dough after the extended first rise at 112. Alternatively, or additionally, yeast inhibiting ingredients may be entirely omitted from the dry mix at 102, and may be at 112.

At 104, the dry mix is hydrated at a relatively cool temperature, referred to herein as a substantially yeast-inactive temperature, at which the yeast is relatively inactive.

The hydrating to the relatively cool temperature includes adding a relatively cold liquid, such as cold water, to the dry mix. The relatively cold liquid may have a temperature in a range of approximately just above freezing to approximately 50 degrees Fahrenheit, and may be approximately 40 to 45 degrees Fahrenheit. The liquid may be cooled, for example, by adding ice cubes to the liquid. For a typical size loaf of bread, for example, a heaping cup of water ice cubes may be stirred into and used to chill approximately 1⅓ cups of water, prior to mixing the water with the dry ingredients. The dough resulting from the addition of chilled water may have a temperature of approximately 55 to 65 degrees Fahrenheit.

Although relatively high temperatures may kill yeast organisms, relatively cool temperatures temporarily place yeast in a sluggish or near-dormant state. However, the cool temperatures will not harm the yeast, which provides a substantially failsafe ability to retard fermentation. When yeast is sluggish or near-dormant, one or more other processes, which may include one or more chemical processes such as increased enzyme activity, may occur, which might otherwise be prevented or hindered by fermentation. The one or more processes may provide slow-forming components to the dough that may improve one or more of taste, texture, aroma, and crust color of subsequently baked dough, relative to conventional baked dough.

The hydrating may include adding more liquid than is conventional or recited in a recipe. The additional liquid may result in dough that is relatively more moist and stirrable than conventional dough.

The hydrating may include mixing the liquid and the dry mix by hand and/or with a mixer device. As described further below, physical kneading of the dough may be partially or completely omitted.

The hydrating may include adding one or more fluid-like substances or ingredients that do not solidify at the relatively cold temperature. Such fluid-like substances may include one or more of honey, molasses, and vegetable oil, including relatively flavorless vegetable oils such as corn and canola oil. Substances that may solidify in cold water, such as olive oil and butter, may be added in after the ice water is incorporated and/or after the first fermentation stage is completed.

At 106, a determination is made as to whether to delay a first rise of the dough. As described below, a delay of the first rise may serve to impart one or more of improved flavor, aroma, texture, and appearance to a baked product. A delay time may be selected to suit a schedule convenient for the baker.

At 108, when a delay is desired, the dough may be held in its original mixing bowl at the relatively cool temperature to maintain the yeast in a substantially inactive state for up to approximately ten hours. The relatively cool temperature may be in a range of between approximately just above freezing to approximately 55 to 60 degrees Fahrenheit, and may be approximately 50 degrees Fahrenheit. The dough may be placed in a refrigerator for the full period of time, or for a portion thereof. To streamline activities, the dough may remain in the original mixing bowl, and may be covered, such as with disposable plastic during the delay period of time. This may reduce or eliminate use of multiple containers, working with the dough on a floured surface, and associated cleaning.

Maintaining the dough at the relatively cool temperature and retarding fermentation for the period of time may provide and/or extend chemical benefits described above with respect to 104, which may further improve flavor, texture, and aromatic features of the subsequently baked dough. The delay may also be utilized to accommodate a schedule and/or a total desired rise time.

A delay at 108 may be in a range of approximately 3 to 10 hours, which may permit a baker to prepare the dough in the evening and delay a first rise overnight, or to prepare the dough in the morning and delay the first rise until evening.

At 110, the dough may be gradually warmed to a relatively moderate temperature, such as a room temperature, and thereafter maintained at the relatively moderate temperature, for a relatively extended period of time. This is referred to herein as an extended first rise or first fermentation of the dough.

The relatively moderate temperature may correspond to a relatively low fermentation rate of the yeast. The relatively moderate temperature may be in a range of approximately 60 to 75 degrees Fahrenheit, including a range of approximately 67 to 70 degrees Fahrenheit. The relatively moderate temperature may be a relatively cool ambient room temperature and the dough may be maintained at the relatively moderate temperature by placing the dough in room or kitchen environment, and/or near an air conditioner vent. For warmer environments, the dough may be refrigerated for approximately 3 hours or more prior to the first rise to slow or retard fermentation.

The dough may be maintained at the relatively moderate temperature for a range of approximately 12 to 24 hours, including a range of approximately 12 to 18 hours, and a range of approximately 18 to 24 hours. The time, referred to herein as a first rise time or first fermentation period, may be selected and/or adjusted to accommodate the baker's schedule, such as described above with respect to 108.

The relatively moderate temperature and the extended rise time may be selected, adjusted, and/or optimized in view of one another. For example, relatively longer rise times may be selected for relatively cooler conditions, and relatively shorter rise times may be selected for relatively warmer conditions. For a relatively warm room, for example, period of approximately 15 hours may be selected.

As the dough warms and the yeast becomes more active, the relatively long, slow fermentation process may provide enhanced flavor.

Fermentation produces carbon dioxide gas bubbles that cause the dough to expand, sometimes three to four-fold, and to have a sponge-like appearance. Over time, on a molecular level the bubbling agitates gliadin and glutenin molecules to cause the molecules to contact one another and form relatively strong, elastic gluten strands, which are useful for bread structure. This process is referred to herein as micro-kneading. Because micro-kneading results from on-going bubbling of fermentation, an extended first fermentation period may provide relatively thorough gluten development. Suitable gluten development is not normally achievable without very laborious hand kneading or the use of electric-powered kneading equipment. Micro-kneaded doughs tend to be elastic and springy and can be stretched out very thinly. The hydration at 104, also referred to herein as super-hydration, facilitates the bubbling.

During the extended rise time, the dough may increase in size approximately three-fold. Accordingly, to streamline steps, the dough may initially be mixed in a container having at least three times an initial volume of the dough. Such a container may thus be used for initial hydration of the dry mix at 104 above and for subsequent volume increase and incorporation of additional ingredients after the first rise.

At 112, the dough may be stirred following the extended first rise. The stirring may at least partially deflate the dough and may substitute for traditional "punching down" of risen dough. The dough may be stirred using a spoon or mixer device.

The stirring may include adding one or more additional ingredients to the dough. The one or more additional ingredients may include a perishable ingredient such as a dairy product. The one or more additional ingredients may include one or more yeast-inhibiting ingredients, described above with respect to 102.

Although super-hydration facilitates the bubbling that develops the gluten in the first rise, too much water in the dough during a second rise, described below with respect to 118, may lead to reduced structure or firmness, which may be undesirable in a finished loaf. Excess water in the dough during the second rise may also lead to doughiness in the subsequently baked product, may dilute the gluten, and may add sufficient weight to cause the dough to sink or droop during baking. To compensate for the super-hydration, the stirring before the second rise may include adding a dehydrating substance, such as flour to obtain a desired or recipe-specified consistency, stiffness, or hardness. Again, as a streamlining measure, the mixing may be performed in the original mixing bowl.

At 114, a determination may be made to delay the second rising of the dough at 116. The second rising may be delayed at 116 to suit a schedule, such as described above with respect to 108 and 110. The second rise may be delayed by cooling the dough and maintaining the dough at a relatively cool temperature, such as in a refrigerator, for up to approximately 24 hours.

At 118, the dough may be warmed to and maintained at the relatively moderate temperature to allow for a period of time sufficient to permit a second rising of the dough. The period of time may be in range of approximately 1½ to 3 hours.

Conventionally, a second rise time may give rise to enhanced flavor and/or aroma. As a result of delayed, retarded, inhibited, and/or prolonged yeast activity at one or more of 104, 108, and 110, however, an accelerated rise time of approximately 45 minutes to 1½ hours may be implemented at 118 without loss, or without significant loss of flavor and/or aroma developed during the retarded first fermentation produced by the use of very cold mixing water and/or the relatively long first rise.

Prior to, during, or subsequent to the second rise at 118, the dough may be shaped and/or placed on a baking pan, sheet, or container, and may be placed on parchment to reduce sticking.

Shaping may include hand-shaping such as, for example, with French baguettes, Italian ciabattas, cinnamon pinwheel loaves, and finger rolls.

In other cases, to eliminate the usual necessity of shaping the dough on a flour-dusted surface, it may be inverted directly into a baking container and the second rising may be performed in the baking container. The container may include one or more shaped or decorative features to impart a shape to the dough, such as, for example, with rustic boules and dessert breads.

Prior to placing the dough into a baking pan, edges of the dough may be folded inwardly. This may be performed around a circumference of the dough, and may be performed using a rubber spatula. The dough may then be inverted into the baking pan. The folding action and the subsequent inverting may help to organize gluten strands, and may substitute for rounding, a hand-shaping technique requiring more dexterity and effort.

At 120, the dough is baked. The dough may be relatively moist and stirrable, and thus may be baked for a longer period of time than recited in a recipe, or longer than a conventional baking period for a similar amount of dough. The baking may be extended, for example, several minutes beyond a point at which conventional dough appears to be relatively fully baked. Such relatively moist dough may have a lower propensity to dry out from over-baking than conventional dough and may benefit from what may otherwise appear to be over-baking.

An exemplary method of preparing a yeasted dough product is disclosed below with respect to a fruit streusel, and with respect to FIG. 1. The exemplary method may be performed with the following exemplary ingredients.

Dough
2½ cups (12.5 ounces) all-purpose unbleached white flour, plus more as needed;
3 tablespoons granulated sugar;
1 teaspoon table salt;
1 teaspoon Fleischmann's® RapidRise or Bread Machine yeast;
3 tablespoons corn oil, canola oil, or other flavorless vegetable oil; and
1 cup plus 3 tablespoons ice cold water, plus more ice water if needed.

Streusel and Filling
1 cup packed light brown sugar;
1½ cups (7.5 ounces) all-purpose unbleached white flour;
1 tablespoon ground cinnamon;
¾ cup (1½ sticks) butter (not margarine), melted;
1 teaspoon vanilla extract (or ½ teaspoon almond extract);
¾ cup slivered almonds or coarsely chopped walnuts, optional;
1 (21-ounce) can Comstock® or Wilderness® More Fruit cherry pie filling;

At 102, the flour, sugar, salt, and yeast are stirred together in a relatively large mixing bowl.

At 104, the oil into the ice water are whisked together in a relatively large measuring cup, and the resultant liquid is stirred into the flour until the ingredients are thoroughly blended. If the mixture is too dry to mix in all the flour, a relatively small amount of additional ice water may be added and stirred into the mixture. The resultant dough should be almost stiff. If necessary, the dough may be firmed up by adding more flour.

Oil may be brushed or sprayed over the top of the dough, and the bowl may be covered, such as with plastic wrap.

At 108, for convenience and/or fuller flavor, the bowl and dough may be refrigerated for 3 to 10 hours.

At 110, the dough may be warmed to about 70 degrees Farenheight, which may correspond to room temperature. The dough may be maintained at room temperature to rise for 8 to 16 hours.

Preparation of the streusel is now described. The brown sugar, flour, and cinnamon, are mixed together in a medium size bowl. Lumps of sugar may be finely crushed. The butter and vanilla, or almond extract, are stirred into the bowl until evenly incorporated within the mixture, and until the mixture forms small clumps. The streusel may be covered and refrigerated until firm and cool, which may take approximately 30 minutes. The streusel may be kept refrigerated for up to a week.

Prior to utilizing the streusel as described below, the streusel may be slightly warmed slightly, towards room temperature, and any large clumps may be broken up. Approximately 1½ cups streusel may be set aside for topping. Remaining streusel is combined at 112 below.

At 112, the remaining streusel is stirred relatively rigorously into the dough, leaving little patches of streusel throughout. The dough is then turned out the into a well-oiled 9×13×2-inch flat baking dish. The dough may be spread or pressed out until evenly thick, using an oiled spatula or fingertips. The cherry filling is then evenly spread over the top of the dough. The nuts and reserved streusel are then sprinkled evenly over the dough top.

The baking dish may be covered, such as with a nonstick spray-coated plastic wrap.

At 116, a second rise of the dough may be delayed, such as by refrigeration for 4 to 24 hours, and subsequently set out at room temperature for a second rise.

At 118, the dough may set at room temperature for between approximately 1½ and 2½ hours.

For an accelerated rise, the baking dish and dough may be placed in a relatively enclosed space with approximately 1 cup of boiling water placed proximate to the baking dish. The enclosed space may be a turn-off microwave or conventional oven.

The baking dish cover may be removed before the rising dough contacts the cover.

The dough may be permitted to rise until it reaches approximately ½ inch below a rim of the baking dish.

Approximately 15 minutes prior to baking the dough at 120, place a rack just below the center of the oven and preheat to the oven to 350 degrees F. Set the baking dish and down on a baking sheet. Bake for approximately 35 to 45 minutes, until the top is browned and a paring knife inserted in the center of the dough comes out with just a few crumbs on the tip, or until the center registers 205 to 207 degrees Fahrenheit on an instant-read thermometer. Remove the baking dish from the oven and place it on a a wire rack to cool for approximately 15 minutes.

Methods are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method, comprising:
   hydrating dry ingredients including yeast with a liquid having a first temperature in a range of approximately 40 to 50 degrees Fahrenheit to provide a dough having a temperature of approximately 55 to 65 degrees Fahrenheit, wherein the hydrating includes combining the dry ingredients with a quantity of the liquid sufficient to provide a stirrable dough and mixing the liquid and the dry ingredients substantially without kneading;
   maintaining the dough at a second temperature within a range of approximately 50 to 60 degrees Fahrenheit for a first fermentation-retarding delay time in a range of approximately three to ten hours;
   increasing the temperature of the dough from the second temperature to a third temperature in a range of approximately 60 to 75 degrees Fahrenheit, and maintaining the dough at the third temperature for a first rise time in a range of approximately twelve to twenty-four hours following the first delay time;
   stirring the dough following the first rise time to at least partially deflate the dough;
   maintaining the dough at a fourth temperature in the range of approximately 60 to 75 degrees Fahrenheit for a second rise time in a range of approximately ¾ to 3 hours following the stirring; and
   baking the dough following the second rise time.

2. The method of claim 1, wherein the first temperature is in a range of approximately 40 to 45 degrees Fahrenheit to provide the dough having a the temperature of approximately 55 to 65 degrees Fahrenheit.

3. The method of claim 1, wherein the hydrating further includes adding ice to the liquid prior to combining the liquid and the dry ingredients.

4. The method of claim 1, wherein the maintaining the dough for the first delay time includes placing the dough in a refrigerator for the first delay time.

5. The method of claim 1, wherein the third and fourth temperatures are in range of approximately 67 to 70 degrees Fahrenheit.

6. The method of claim 1, wherein the second rise time is in a range of approximately ¾ to 1½ hours.

7. The method of claim 1, further comprising:
   placing the dough in a refrigerator for a second delay time of between 4 and 24 hours between the stirring and the second rise time.

8. The method of claim 1, further comprising:
   combining the dry ingredients prior to the hydrating; and
   packaging the dry ingredients in a commercial package.

9. The method of claim 1, wherein the dry ingredients include a fermentation inhibitor, including one or more of sugar, dried fruit, garlic, onion, oregano, thyme, mustard cinnamon, cloves, cardamom, ginger, and a dairy product, the method further including withholding at least a portion of the fermentation-inhibitor from the dough until the stirring.

10. The method of claim 1, wherein the third and fourth temperatures are in a range of approximately 67 to 70 degrees Fahrenheit.

11. The method of claim 1, wherein the stirring includes:
    adding flour to the dough to dehydrate the dough.

* * * * *